Jan. 2, 1951   D. D. AUSTIN, SR   2,536,343
METHOD FOR SHAVING CROWN GEARS
BY ROCKING AND TRAVERSE
Filed April 29, 1947

INVENTOR.
DONALD D. AUSTIN SR.

BY
Whittemore, Hulbert
& Belknap ATTORNEYS

UNITED STATES PATENT OFFICE 2,536,343

METHOD FOR SHAVING CROWN GEARS BY ROCKING AND TRAVERSE

Donald D. Austin, Sr., Detroit, Mich., assignor to National Broach & Machine Company, Detroit, Mich., a corporation of Michigan Application April 29, 1947, Serial No. 744,678

14 Claims. (Cl. 90—1.6)

The present invention relates to a method for shaving crown gears.

The new method of shaving crown gears is applied to a process known in the art as crossed axes gear shaving. This practice comprises a gear-like cutter formed of tool steel and having the flanks of the teeth provided with narrow grooves extending generally up and down the teeth so as to provide sharp cutting edges in the tooth surface. A gear-like cutter is selected of such helix angle that it will mesh with the work gear with their axes crossed at a limited angle preferably between 2° and 30°. The nature of the meshing engagement between a pair of gears at the crossed axes relationship referred to is such that in theory the teeth of the gear and the teeth of the gear-like cutter contact a theoretical point. In practice, due to the fact that the surfaces of the cutter teeth are interrupted as aforesaid and due to compression of metal and other reasons, the actual contact between the teeth of the cutter and gear occupies a small zone.

If the gear and tool were rotated in mesh without other relative motion, the teeth of the cutter would generate relatively narrow zones extending straight up and down on a spur gear and diagonally up and down on teeth of a helical gear, and if a depth feed were superimposed upon rotation without other relative motion the gear would have machined therein concave grooves parallel to the narrow zones referred to. In order to provide accurate finishing of the gear teeth from end to end it is therefore necessary to superimpose an additional motion between the gear and cutter so as to distribute the cutting action of the cutter from end to end of the gear teeth.

When the crossed axes method of shaving came into use some years ago it was the usual practice to provide for a relative reciprocation between the cutter and gear in a direction parallel to the axis of the gear. This distributed the cutting action uniformly from end to end of the gear teeth but resulted in excessive wear on the cutter teeth, since only a narrow portion of the cutter teeth entered into the cutting action.

More recently it has been found that superior results are obtained when the direction of relative reciprocation between the cutter and gear is in a plane parallel to the axes of both gear and cutter, which direction extends in said plane at an angle diagonal to the axes of both gear and cutter and which direction does not approach a perpendicular to the axis of the gear or cutter.

Gear teeth finished in accordance with either of the above methods were uniform from end to end. It has become desirable to provide gear teeth which are modified from end to end or crowned so that a pair of such gears take contact adjacent the mid portions of the teeth and avoid end contact. This desirable mating condition will of course be obtained with a pair of gears only one of which is crowned, the other of which is unmodified. Originally crowning of gear teeth during the crossed axes shaving operation was carried out by relatively rocking the gear and tool in timed relation to the traverse referred to. In other cases the crowning operation was performed by superimposing upon the relative traverse a gradual depth feed which caused the cutter to take a greater depth of cut adjacent the ends of the gear teeth than centrally thereof. It was also suggested that it may be possible to crown gear teeth by providing a relative rocking motion between the gear and cutter in the absence of a relative traverse, but this method was thought to be limited to a relative rocking motion about an axis perpendicular to the direction of the engaged teeth of the gear and cutter, and it was further thought that it should be a very slow rocking, on the order of .0001 inch per revolution of the gear.

It has now been found that gear teeth may be crowned in a crossed axes shaving operation by a method characterized by comparatively rapid relative rocking motion between the gear and cutter while the same are rotated at substantial speeds. This rocking motion is superimposed upon relative traverse, either axial or diagonal traverse, but it is not synchronized to cause one rocking motion in one direction for each traverse stroke as has heretofore been considered essential.

With the foregoing general remarks in mind, it is an object of the present invention to provide a new method of crowning gears by a crossed axes shaving operation.

It is a further object of the present invention to provide a method of crowning gears during a crossed axes shaving operation in which a relative rocking motion between the gear and gear-like cutter is carried out at substantial speeds, and combined with the usual traverse.

It is a further object of the present invention to provide a method of crowning gear teeth by rolling the gear to be finished in mesh with a gear-like cutter at crossed axes, simultaneously providing a relative rocking motion between the gear and cutter about an axis which extends at an angle with respect to the axis of the gear, and simultaneously relatively traversing said gear and cutter.

It is a further object of the present invention to provide a crowning motion in crossed axes gear shaving which is a relative rocking motion combined with traverse such that a plurality of rocks are completed during each stroke of traverse.

Other objects and features of the invention will become apparent as the description proceeds, especially when considered in conjunction with the accompanying drawings, wherein.

The crowning operation disclosed herein is a combination of relative traverse and rocking movement. Thus, in Figure 1 there is illustrated a tool C in the form of a gear-like cutter and a work gear which are illustrated as in mesh with their axes crossed at a small angle. In this case a relative traverse between the gear and tool is provided in the direction of the arrow T, which in this figure is in the plane of the paper parallel to the axis of the gear G. Superimposed upon this relative traverse is a relative rocking motion such as produced by rocking the gear G about a pivot axis P having a radius R.

Thus, the plane of rocking and the direction of traverse are both parallel to the gear axis. The relationship and relative movements thus far described are similar to the conventional crowning movements previously known. However, in the past the rocking movement of the gear G was carefully timed with respect to the traverse such that during one stroke of traverse the gear completed one-half of a rocking movement. In the present case it is desirable to complete a plurality of rocking movements during each stroke of traverse and it is unimportant whether these rocking movements are timed with respect to the traverse. Thus, for example, if the traverse takes place at a rate such that 20 seconds are necessary to complete a stroke of traverse the gear may be rocked at a rate such that a rock is completed every 10 seconds, in which case two complete rocks would take place during traverse. However, it is not necessary that the second complete rock terminate with traverse and instead the rocking motion could result in 2, 2½, 3, 3½ or other numbers of rocking movements taking place during a single stroke of traverse. This of course necessarily results in a rocking motion taking place at substantially higher rates than were previously considered feasible. One important result of the speeding up of the rocking motion is that improved surface finish results, and further that stock removal may be relatively rapid.

Figure 2:
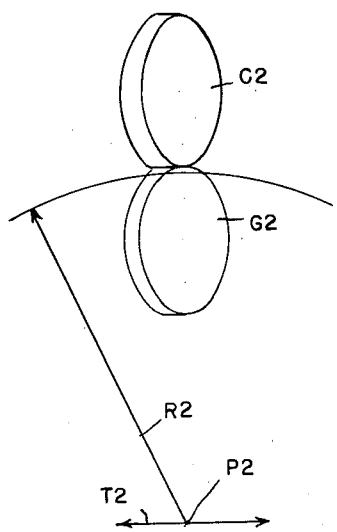
Figure 2 is a diagrammatic view illustrating another embodiment of gear crowning method.

Referring now to Figure 2, there is illustrated a tool C2 in the form of a gear-like cutter in mesh with a work gear G2 at crossed axes. In this instance the axis of the work gear G2 is illustrated as extending at an angle of about 45° with respect to the plane of the figure. In this case the crowning operation is carried out by providing a relative rocking motion between the gear and tool such as would be produced by rocking the gear about the pivot axis P2 with a radius R2. Superimposed upon this motion, however, is a relative traverse in the direction indicated by the arrow T2. This direction of relative traverse is illustrated as being in the plane of the paper and is accordingly at an angle of approximately 45° to the axis of the gear. This results in parallelism between the direction of traverse and the plane of rocking.

This direction of traverse was referred to above as a diagonal traverse, and it has the effect of causing a simultaneous shifting of the center of crossed axes between the gear and tool. This shifting of the center of crossed axes has the result of distributing the finishing action of the tool from end to end of the gear teeth and in addition it distributes the cutting action along the cutter teeth so as to reduce local wear on the cutter teeth, produces freer cutting, and has other desirable features.

In this case the crowning rocking motion is carried out as above mentioned without reference to the rate of traverse, although it is desired as in the foregoing cases to provide a plurality of complete rocking motions during each stroke of traverse. This, however, is not essential and may be impossible since diagonal traverse may result in complete finishing of the gear tooth during very short strokes. In certain cases, however, it may be desirable to correlate the rocking movement and the traverse such that a complete rocking movement takes place while the center of crossed axes is adjacent one end of the gear teeth and a second complete rocking takes place while the center of crossed axes is adjacent the opposite end of the gear teeth.

Figure 3:
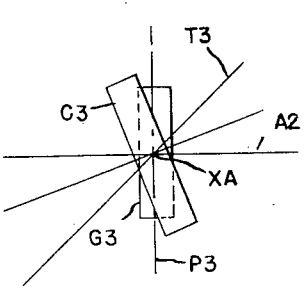
Figure 3 is a diagrammatic view illustrating yet another embodiment of the method of crowning gears.

Referring now to Fig. 3, there is illustrated a method somewhat similar to that illustrated in Figure 2 but differing specifically therefrom in that the direction of traverse is obliquely disposed to the plane of rocking. In this figure, which may be considered as a plan view looking downward on a meshing gear and tool, there is shown a cutting tool C3 in mesh with a work gear G3. These two parts are rotated in mesh at relatively high speeds. Relative traverse between the cutter and gear is in the direction of the arrow T3 which is herein illustrated as approximately 30° to the axis of the gear. The common normal to the axis of the cutter and gear extends perpendicular to the plane of the figure at the point designated XA and relative traverse in the direction of the arrow T3 causes a simultaneous relative movement between the center of crossed axes and both the gear and cutter. This in turn results in a progressive distribution of the cutting action along the teeth of the gear. In this case the rocking motion which results in the crowning of the gear teeth takes place in the arc A2 about the center whose pivot axis is designated at P3. In this case the axis P3 is illustrated as being perpendicular to the axis of the gear, although it may be at any reasonable angle relative thereto.

Comparing the methods illustrated in Figures 2 and 3, in Figure 2 relative motion between the tool and gear due both to rocking and to traverse occupies the plane of the figure, or in other words relative traverse is in the plane of rocking. In Figure 3, however, relative traverse in the direction of the arrow T3 is oblique to the plane of rocking, this last plane appearing in the figure as the arc A3.

Figure 1:
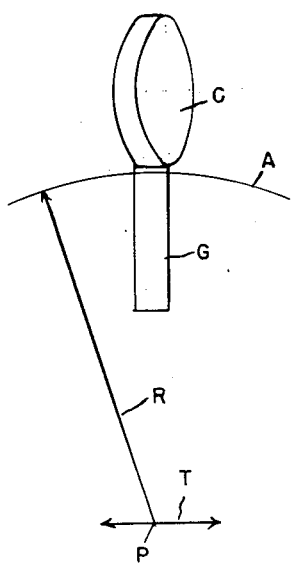
Figure 1 is a diagrammatic view illustrating the method of crowning gears.

The direction of relative traverse between the gear and cutter may therefore be any angle from 0° upwardly so long as it does not approach too closely to a direction perpendicular to the axis of the cutter or gear, and rocking may take place about an axis disposed in a plane parallel to the axes of both gear and cutter and extending in any direction in such plane so long as it does not approach too closely to parallelism with respect to the axis of the work gear.

Where the rocking motion is combined with traverse, attention must be paid to the additive and subtractive effects of rocking and traverse. Thus, for example, where rocking motion or traverse is too rapid the surface finish is unsatisfactory. Referring to Figure 1, for example, if traverse to the right in the direction of the arrow T were added to rocking motion to the right through the arc A and the result of the two motions was excessive, the surface finish would be unsatisfactory. On the other hand, where rocking motion is in the opposite direction from traverse it may be at a substantially higher value. This leads to the possibility of carrying out the rocking motion at different speeds in different directions. In a specific case as traverse is started to the right as seen in Figure 1 and as rocking is started to the right, the rocking motion would be carried out at a reduced value. During the return rocking movement, since traverse is continuing at the same uniform rate, rocking movement from right to left could be at a substantially greater rate. However, upon completion of traverse and as traverse is initiated in the opposite direction the rocking motion relationship should be changed so that rocking from right to left would be carried out at a slower rate while rocking from left to right could be at an increased rate.

Figure 4:
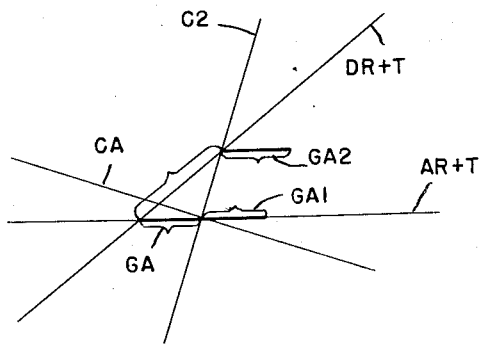
Figure 4 is a diagrammatic view illustrating axial advance of the gear through the plane of the cutter as effected herein.

Referring now to Figure 4, there is diagrammatically illustrated the axial advance of the work through the plane of the cutter during the present method. It will be recalled that the cutter employed in this method is in the form of a gear having serrations running up and down its teeth which provide cutting edges. In order that the surface of the teeth of the gear machined by the present method shall be smooth, it is necessary to provide for a controlled axial advance of the gear through the plane of the cutter so that this axial advance shall be within certain limits for each revolution of the gear. If the advance is too slow, high production cannot be obtained. If the advance is too rapid, surface finish is impaired. In Figure 4 there is illustrated a cutter axis CA in angular relationship with a gear axis GA, these axes being illustrated as being crossed at a small angle. Perpendicular to the cutter axis is a line designated CP which represents the cutter plane. The line ART which is parallel to the gear axis GA is a direction of relative movement compounded of rocking and traverse, in which the pivot axis about which the rocking takes place is perpendicular to the axis of the gear so that the plane of rocking is parallel to the axis of the gear.

The line DRT represents a direction of relative movement compounded of diagonal rocking and diagonal traverse, in which case the pivot axis about which the rocking motion takes place is diagonally disposed with respect to the axis of the gear, and traverse is in the plane of rocking.

In order to obtain similar surface finish when different directions of rocking and traverse are employed, the important factor to be considered is the advance of the gear axis GA through the cutting plane CP. Thus, for example, as the relative motion takes place in the direction of the line ART a linear movement of the gear equal to its width will cause the gear axis to be moved from the position GA to the position GA1, and this of course corresponds to an axial advance of the work through the cutter plane CP equal to the length of the line GA.

However, if the direction of rocking and traverse is diagonal, as for example in the direction of the line DRT, a different situation exists. In this case for the designated length of gear axis GA to be moved axially through the cutting plane CP a greater distance of relative motion is required. This distance is designated in Figure 4 as D, which, it will be observed, is substantially greater than the distance GA. In other words, when employing diagonal rocking and traverse the rate of rocking may be substantially increased without impairment of surface finish, and this in turn leads to more rapid production.

Where in the claims reference is made to axial advance of the gear through the cutting plane of the cutter, it is the foregoing relationship to which reference is made.

It has been found that when the rate of axial advance of the work through the plane of the cutter is such that the advance per revolution of the work gear is at least .005 inch, production is satisfactory. In other words, an operation carried out at this rate completely shaves and crowns a gear in a reasonable length of time. However, it is preferred to carry out this operation at a substantially greater rate, and combined traverse and rocking are preferably such that the relative axial advance of the work through the plane of the cutter is approximately .015 inch per revolution of the work. Satisfactory results have been obtained at substantially higher rates than this and the upper limit on the axial advance per revolution of the work is controlled by other factors, such for example as the material being cut or the material from which the cutter is formed.

In the practice of this method, each finishing operation is terminated at the end of a traverse stroke and also at one end of a rocking motion, and the direction of traverse and rocking just prior to termination of each will have been generally in the same direction. Since rocking and traverse are not timed, and a plurality of rocking strokes take place during each traverse stroke, traverse and rocking may not terminate simultaneously. Instead, some fraction of a rocking motion may take place after termination of traverse in order that termination of rocking and traverse shall take place in position furthest removed from the central plane of the cutter. This usually results in stopping in backlash, which is desirable.

Briefly reviewed, the present invention teaches the crowning of a gear by rolling the same in mesh with a gear-like cutter at crossed axes and providing a rocking motion between the gear and cutter about an axis which is parallel to a plane parallel to the axes of both gear and cutter and which may extend in said plane at any angle from parallel to the axis of the gear to perpendicular thereto. A limiting condition exists when rocking takes place about an axis parallel to the axis of said gear. At this time, repeated rocking combined with traverse may result in a straight, uncrowned tooth. As angularity between the axis of rocking and gear axis increases from 0° to 90°, other conditions remaining constant, the amount of crown produced increases. Further, this rocking motion is combined with relative traverse between the gear and tool in a direction which occupies a plane parallel to the axes of the gear and tool and which may extend at any direction in such plane. However, when the relative rocking motion is combined with traverse, attention must be paid to the resultant relative motion longitudinally of the gear and cutter teeth. Also it is desirable to provide the rocking motion at a rate sufficient to produce a plurality of complete rocks during each stroke of relative traverse. In practice, for obtaining uniformity of cutting action on opposite sides of the gear teeth, it is desirable to reverse the direction of rotation of the parts during the operation, and this is preferably effected at the end of a traverse stroke. If the amount of stock to be removed is sufficient to require radial in-feed, this depth feed also is preferably effected at the end of a traverse stroke.

While in Figures 1 and 2 rocking and traverse are shown as parallel, this need not be the case. Instead, diagonal rocking may be combined with axial traverse, and vice versa, and the direction of rocking and traverse may be angularly related to each other and to the axes of both gear and cutter.

The drawings and the foregoing specification constitute a description of the improved method for shaving crown gears by rocking and traverse in such full, clear, concise and exact terms as to enable any person skilled in the art to practice the invention, the scope of which is indicated by the appended claims.

What I claim as my invention is:

1. The method of crown shaving a gear which comprises meshing said gear with a gear-like shaving cutter with their axes crossed at an angle of less than 30°, rotating said gear and cutter in mesh at cutting speeds, and providing a cross-feed traverse composed of two independent relative motions between said gear and cutter, one of which imparts a crowned contour to the teeth of said gear, said motions being a rectilinear relative traverse in a direction parallel to the axis of said gear, and a relative rocking motion about an axis which occupies a plane parallel to the axes of said gear and cutter in mid position and which is diagonally related to the axis of said gear, the speed of said traverse and rocking being such as to cause axial advance of the gear through the plane of the cutter at not less than .005 inch per gear revolution, and providing a plurality of complete rocking strokes for each stroke of traverse.

2. The method of crown shaving a gear which comprises meshing said gear with a gear-like shaving cutter with their axes crossed at an angle of less than 30°, rotating said gear and cutter in mesh at cutting speeds, and providing a cross-feed traverse composed of two independent relative motions between said gear and cutter, one of which imparts a crowned contour to the teeth of said gear, said motions being a rectilinear relative traverse in a direction parallel to the axis of said gear, and a relative rocking motion about an axis which occupies a plane parallel to the axes of said gear and cutter in mid position and which is diagonally related to the axis of said gear, and the speed of said traverse and rocking being such as to cause axial advance of the gear through the plane of the cutter at approximately .015 inch per gear revolution, and providing a plurality of complete rocking strokes for each stroke of traverse.

3. The method of crown shaving a gear which comprises meshing said gear with a gear-like shaving cutter with their axes crossed at an angle of less than 30°, rotating said gear and cutter in mesh at cutting speeds, and providing a cross-feed traverse composed of two independent relative motions between said gear and cutter, one of which imparts a crowned contour to the teeth of said gear, said motions being a rectilinear relative traverse in a plane parallel to the axes of both gear and cutter in a direction diagonal to the axes of both gear and cutter, and a relative rocking motion about an axis which occupies a plane parallel to the axes of said gear and cutter in mid position and which is perpendicular to the axis of said gear, the speed of said traverse and rocking being such as to cause axial advance of the gear through the plane of the cutter at approximately .015 inch per gear revolution, and providing a plurality of complete rocking strokes for each stroke of traverse.

4. The method of crown shaving a gear which comprises meshing said gear with a gear-like shaving cutter with their axes crossed at an angle of less than 30°, rotating said gear and cutter in mesh at cutting speeds, and providing a cross-feed traverse composed of two independent relative motions between said gear and cutter, one of which imparts a crowned contour to the teeth of said gear, said motions being a rectilinear relative traverse in a plane parallel to the axes of both gear and cutter in a direction diagonal to the axes of both gear and cutter, and a relative rocking motion about an axis which occupies a plane parallel to the axes of said gear and cutter in mid position and which is perpendicular to the axis of said gear, the speed of said traverse and rocking being such as to cause axial advance of the gear through the plane of the cutter at not less than .005 inch per gear revolution, and providing a plurality of complete rocking strokes for each stroke of traverse.

5. The method of crown shaving a gear which comprises meshing said gear with a gear-like shaving cutter with their axes crossed at an angle of less than 30°, rotating said gear and cutter in mesh at cutting speeds, and providing a cross-feed traverse composed of two independent relative motions between said gear and cutter, one of which imparts a crowned contour to the teeth of said gear, said motions being a rectilinear relative traverse in a plane parallel to the axes of both gear and cutter in a direction to cause the cutting action to progress longitudinally of the gear teeth, and a relative rocking motion about an axis which occupies a plane parallel to the axes of said gear and cutter in mid position and which is diagonally related to the axis of said gear, the speed of said traverse and rocking being such as to cause axial advance of the gear through the plane of the cutter at not less than .005 inch per gear revolution, and providing a plurality of complete rocking strokes for each stroke of traverse.

6. The method of crown shaving a gear which comprises meshing said gear with a gear-like shaving cutter with their axes crossed at an angle of less than 30°, rotating said gear and cutter in mesh at cutting speeds, and providing a cross-feed traverse composed of two independent relative motions between said gear and cutter, one of which imparts a crowned contour to the teeth of said gear, said motions being a rectilinear relative traverse in a plane parallel to the axes of both gear and cutter in a direction diagonal to the axes of both gear and cutter, and a relative rocking motion about an axis which occupies a plane parallel to the axes of said gear and cutter in mid position and which is diagonal to the axis of said gear, the speed of said traverse and rocking being such as to cause axial advance of the gear through the plane of the cutter at not less than .005 inch per gear revolution, and providing a plurality of complete rocking strokes for each stroke of traverse.

7. The method of crown shaving a gear which comprises meshing said gear with a gear-like shaving cutter with their axes crossed at an angle of less than 30°, rotating said gear and cutter in mesh at cutting speeds, and providing a cross-feed traverse composed of two independent relative motions between said gear and cutter, one of which imparts a crowned contour to the teeth of said gear, said motions being a rectilinear relative traverse in a plane parallel to the axes of both gear and cutter in a direction diagonal to the axes of both gear and cutter, and a relative rocking motion about an axis which occupies a plane parallel to the axes of said gear and cutter in mid position and which is diagonal to the axis of said gear, the speed of said traverse and rocking being such as to cause axial advance of the gear through the plane of the cutter at about .015 inch per gear revolution, and providing a plurality of complete rocking strokes for each stroke of traverse.

8. The method of crown shaving a gear which comprises meshing said gear with a gear-like shaving cutter with their axes crossed at an angle of less than 30°, rotating said gear and cutter in mesh at cutting speeds, and providing a cross-feed traverse composed of two independent relative motions between said gear and cutter, one of which imparts a crowned contour to the teeth of said gear, said motions being a rectilinear relative traverse in a plane parallel to the axes of both gear and cutter in a direction to cause the cutting action to progress longitudinally of the gear teeth, and a relative rocking motion about an axis which occupies a plane parallel to the axes of said gear and cutter in mid position and which is angularly related to the axis of said gear, the speed of said traverse and rocking being such as to cause axial advance of the gear through the plane of the cutter at not less than .005 inch per gear revolution of the gear and varying the rate of rocking in accordance with whether its effectiveness is additive or subtractive with respect to the direction of traverse to maintain the progress of cutting action more nearly uniform.

9. The method of crown shaving a gear which compirses meshing said gear with a gear-like shaving cutter with their axes crossed at an angle of less than 30°, rotating said gear and cutter in mesh at cutting speeds, and providing a cross-feed traverse composed of two independent relative motions between said gear and cutter, one of which imparts a crowned contour to the teeth of said gear, said motions being a rectilinear relative traverse in a plane parallel to the axes of both gear and cutter in a direction to cause the cutting action to progress longitudinally of the gear teeth, and a relative rocking motion about an axis which occupies a plane parallel to the axes of said gear and cutter in mid position and which is angularly related to the axis of said gear, the speed of said traverse and rocking being such as to cause axial advance of the gear through the plane of the cutter at not less than .005 inch per gear revolution and alternately increasing and decreasing the rate of rocking as the direction of rocking is opposed to or in the direction of traverse.

10. The method of crown shaving a gear which comprises meshing said gear with a gear-like shaving cutter with their axes crossed at an angle of less than 30°, rotating said gear and cutter in mesh at cutting speeds, and providing a cross-feed traverse composed of two independent relative motions between said gear and cutter, one of which imparts a crowned contour to the teeth of said gear, said motions being a rectilinear relative traverse in a plane parallel to the axes of both gear and cutter in a direction to cause the cutting action to progress longitudinally of the gear teeth, and a relative rocking motion about an axis which occupies a plane parallel to the axes of said gear and cutter in mid position and which is angularly related to the axis of said gear, the speed of said traverse and rocking being such as to cause axial advance of the gear through the plane of the cutter at not less than .005 inch per gear revolution and alternately increasing and decreasing the rate of rocking as the direction of rocking is opposed to or in the direction of traverse, the traverse and rocking both being continuous and related such that a plurality of complete back and forth rocking movements are completed with each traverse.

11. The method of crown shaving a gear which comprises meshing said gear with a gear-like shaving cutter with their axes crossed at an angle of less than 30°, rotating said gear and cutter in mesh at cutting speeds, and providing a cross-feed traverse composed of two independent relative motions between said gear and cutter, one of which imparts a crowned contour to the teeth of said gear, said motions being a rectilinear relative traverse in a plane parallel to the axes of both gear and cutter in a direction to cause the cutting action to progress longitudinally of the gear teeth, and a relative rocking motion about an axis which occupies a plane parallel to the axes of said gear and cutter in mid position and which is perpendicularly related to the axis of said gear, the speed of said traverse and rocking being such as to cause axial advance of the gear through the plane of the cutter at not less than .005 inch per gear revolution, the traverse and rocking both being continuous and related such that a plurality of complete back and forth rocking movements are completed with each traverse.

12. The method of crown shaving a gear which comprises meshing said gear with a gear-like shaving cutter with their axes crossed at an angle of less than 30°, rotating said gear and cutter in mesh, and providing a cross-feed traverse composed of two independent relative motions between said gear and cutter, one of which imparts a crowned contour to the teeth of said gear, said motions being a rectilinear relative traverse in a plane parallel to the axes of both gear and cutter in a direction to cause the cutting action to progress longitudinally of the gear teeth, and a relative rocking motion about an axis which occupies a plane parallel to the axes of said gear and cutter in mid position, the speed of said traverse and rocking being such as to cause axial advance of the gear through the plane of the cutter at not less than .005 inch per gear revolution, the traverse and rocking both being continuous and related such that a plurality of complete back and forth rocking movements are completed with each traverse.

13. The method of crown shaving a gear which comprises meshing said gear with a gear-like shaving cutter with their axes crossed at an angle of less than 30°, rotating said gear and cutter in mesh, and providing a cross-feed traverse composed of two independent relative motions between said gear and cutter, one of which imparts a crowned contour to the teeth of said gear, said motions being a rectilinear relative traverse in a plane parallel to the axes of both gear and cutter in a direction to cause the cutting action to progress longitudinally of the gear teeth, and a relative rocking motion about an axis which occupies a plane parallel to the axes of said gear and cutter in mid position, the traverse and rocking both being continuous and related such that a plurality of complete back and forth rocking movements are completed with each traverse.

14. The method of crown finishing a gear which comprises meshing said gear with a gear-like finishing tool with their axes crossed at an angle of less than 30°, rotating said gear and tool in mesh, and providing a cross-feed traverse composed of two independent relative motions between said gear and tool, one of which imparts a crowned contour to the teeth of said gear, said motions being a rectilinear relative traverse in a plane parallel to the axes of both gear and tool in a direction to cause the finishing action to progress longitudinally of the gear teeth, and a relative rocking motion about an axis which occupies a plane parallel to the axes of said gear and tool in mid position, the speed of said traverse and rocking being such as to cause axial advance of the gear through the plane of the tool at not less than .005 inch per gear revolution, the traverse and rocking both being continuous and related such that a plurality of complete back and forth rocking movements are completed with each traverse.

DONALD D. AUSTIN, Sr.

REFERENCES CITED

The following references are of record in the file of this patent:

UNITED STATES PATENTS

| Number | Name | Date |
|---|---|---|
| 2,157,981 | Drummond | May 9, 1939 |
| 2,249,251 | Mentley | July 15, 1941 |
| 2,277,041 | Drummond | Mar. 24, 1942 |
| 2,346,266 | Mentley | Apr. 11, 1944 |